(12) United States Patent
Sheridan

(10) Patent No.: US 8,900,090 B2
(45) Date of Patent: Dec. 2, 2014

(54) GEARED ARCHITECTURE GAS TURBINE ENGINE WITH IMPROVED LUBRICATION AND MISALIGNMENT TOLERANT ROLLER BEARING SYSTEM

(71) Applicant: United Technologies Corporation, Hartford, CT (US)

(72) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 56 days.

(21) Appl. No.: 13/691,171

(22) Filed: Nov. 30, 2012

(65) Prior Publication Data

US 2014/0155213 A1 Jun. 5, 2014

(51) Int. Cl.
*F16H 57/08* (2006.01)
*F16H 57/04* (2010.01)
*F02C 7/36* (2006.01)

(52) U.S. Cl.
CPC ............. *F02C 7/36* (2013.01); *F16H 57/0456* (2013.01); *F16H 57/0421* (2013.01); *F16H 57/0479* (2013.01)
USPC .......................................... 475/331; 184/6.12

(58) Field of Classification Search
CPC ...................... F16H 57/082; F16H 57/0421
USPC .......................................... 475/331; 184/6.12
See application file for complete search history.

(56) References Cited

U.S. PATENT DOCUMENTS

| 2,387,230 | A | * | 10/1945 | Bock ............................... 192/61 |
| 4,378,711 | A | * | 4/1983 | Daniel .......................... 74/467 |
| 6,223,616 | B1 | | 5/2001 | Sheridan |
| 7,104,918 | B2 | * | 9/2006 | Mitrovic ....................... 475/331 |
| 7,174,997 | B2 | | 2/2007 | Sheridan |
| 7,377,110 | B2 | | 5/2008 | Sheridan et al. |
| 7,704,178 | B2 | * | 4/2010 | Sheridan et al. ............. 475/159 |
| 7,883,439 | B2 | | 2/2011 | Sheridan et al. |
| 7,926,260 | B2 | | 4/2011 | Sheridan et al. |
| 8,020,665 | B2 | | 9/2011 | Sheridan et al. |
| 8,246,503 | B2 | | 8/2012 | Sheridan et al. |
| 8,262,535 | B2 | | 9/2012 | Klingels |
| 8,276,275 | B2 | | 10/2012 | Sheridan et al. |
| 8,512,192 | B2 | * | 8/2013 | Ziemer et al. ................. 475/159 |
| 2006/0160654 | A1 | * | 7/2006 | Tiesler et al. ................. 475/331 |
| 2007/0010365 | A1 | * | 1/2007 | Schmitt ....................... 475/159 |
| 2008/0006018 | A1 | | 1/2008 | Sheridan et al. |
| 2009/0090096 | A1 | | 4/2009 | Sheridan |
| 2011/0299974 | A1 | | 12/2011 | Gauthier et al. |
| 2012/0272762 | A1 | | 11/2012 | Sheridan |
| 2013/0102432 | A1 | * | 4/2013 | Imai et al. .................... 475/159 |

FOREIGN PATENT DOCUMENTS

DE  102010051946 A1 * 5/2012 ............. B21D 39/00

OTHER PUBLICATIONS

International search report for PCT/US2013/082306 dated Mar. 12, 2014.

\* cited by examiner

*Primary Examiner* — Tisha Lewis

(57) ABSTRACT

A gas turbine engine includes a structural oil baffle housing which at least partially supports a set of intermediate gears. Each of the intermediate gears is mounted to a respective flexible carrier post. A spherical joint is mounted to each flexible carrier post and the structural oil baffle housing is mounted to the spherical joint mounted to each flexible carrier post.

17 Claims, 7 Drawing Sheets

ND MISALIGNMENT TOLERANT ROLLER
GEARED ARCHITECTURE GAS TURBINE ENGINE WITH IMPROVED LUBRICATION AND MISALIGNMENT TOLERANT ROLLER BEARING SYSTEM

BACKGROUND

The present disclosure relates to a gas turbine engine and, more particularly, to a geared architecture therefor.

Epicyclic gear systems with planetary or star gearboxes may be used in gas turbine engines for their compact designs and efficient high gear reduction capabilities. Planetary and star gearboxes generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate.

In gas turbine engine architectures where speed reduction transmission is required, the central sun gear generally receives rotary input from the powerplant, the outer ring gear is stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, lightweight structural engine case assemblies may deflect upon aero and maneuver loads that may cause transverse deflection commonly known as backbone bending. This deflection may cause the individual sun or planet gear's axis of rotation to lose parallelism with the central axis and may result in some misalignment at gear train journal bearings and at the gear teeth mesh. This misalignment may lead to efficiency losses and the potential for reduced life.

SUMMARY

A gas turbine engine according to one disclosed non-limiting embodiment of the present disclosure includes a geared architecture with a multiple of intermediate gears, and a structural oil baffle housing that at least partially supports said set of intermediate gears.

In a further embodiment of the foregoing embodiment, each of said multiple of intermediate gears is mounted to a respective flexible carrier post. In the alternative or additionally thereto, the foregoing embodiment includes a spherical joint mounted to each flexible carrier post. In the alternative or additionally thereto, in the foregoing embodiment structural oil baffle housing is mounted to a spherical joint mounted to each flexible carrier post.

In a further embodiment of any of the foregoing embodiments, the gas turbine engine includes a rotationally fixed carrier, each of said multiple of intermediate gears mounted to a respective flexible carrier post which extends from said carrier. In the alternative or additionally thereto, the foregoing embodiment includes an oil manifold defined by said carrier. In the alternative or additionally thereto, in the foregoing embodiment the oil manifold includes a first oil circuit and a second oil circuit. In the alternative or additionally thereto, in the foregoing embodiment the first oil circuit communicates with each respective flexible carrier post. In the alternative or additionally thereto, in the foregoing embodiment the second oil circuit communicates with a multiple of oil nozzles.

In a further embodiment of any of the foregoing embodiments, the gas turbine engine includes a rolling element bearing mounted between said structural oil baffle housing and each of said multiple of intermediate gears. In the alternative or additionally thereto, in the foregoing embodiment the structural oil baffle housing directs oil to said multiple of intermediate gears. In the alternative or additionally thereto, in the foregoing embodiment the multiple of oil nozzles are external to said structural oil baffle housing.

In a further embodiment of any of the foregoing embodiments, the geared architecture includes a planetary gear system.

In a further embodiment of any of the foregoing embodiments, the geared architecture includes a star gear system.

A gas turbine engine according to another disclosed non-limiting embodiment of the present disclosure includes a carrier which defines an oil manifold with a first oil circuit and a second oil circuit, a multiple of flexible carrier post which extends from said carrier to support a respective intermediate gear, said first oil circuit communicates with each respective flexible carrier post, a structural oil baffle housing which at least partially supports said set of intermediate gears, and a multiple of oil nozzles in communication with said second oil circuit.

In a further embodiment of the foregoing embodiment, the multiple of oil nozzles are each adjacent to a sun gear and one of said multiple of intermediate gears. In the alternative or additionally thereto, the foregoing embodiment includes a rolling element bearing mounted between said structural oil baffle housing and each of said multiple of intermediate gears. In the alternative or additionally thereto, in the foregoing embodiment the rolling element bearing is a ball bearing. In the alternative or additionally thereto, in the foregoing embodiment the rolling element bearing is a roller bearing.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
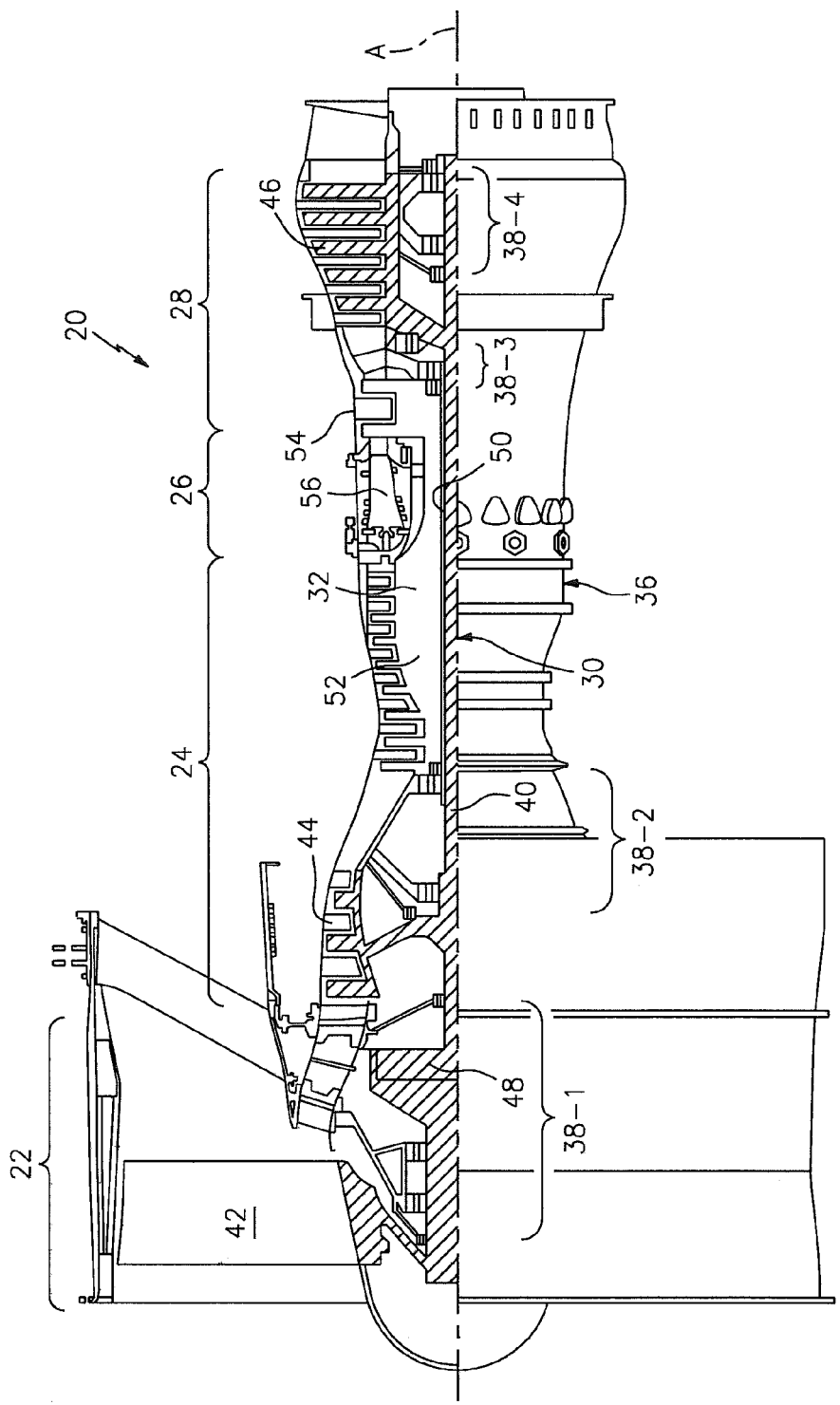
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may include an augmentor section (not shown) among other systems or features. Although schematically illustrated as a turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor and a high pressure compressor with an intermediate pressure turbine (IPT) between a high pressure turbine and a low pressure turbine as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26 then expansion through the turbine section 28. The engine 20 generally includes a low spool 30 and a high spool 32 mounted for rotation about an engine central longitudinal axis A relative to an engine case assembly 36 via several bearing compartments 38-1, 38-2, 38-3, 38-4.

The low spool 30 generally includes an inner shaft 40 that interconnects a fan 42, a low-pressure compressor 44 ("LPC") and a low-pressure turbine 46 ("LPT"). The inner shaft 40 drives the fan 42 through a geared architecture 48 to drive the fan 42 at a lower speed than the low spool 30. The high spool 32 includes an outer shaft 50 that interconnects a high-pressure compressor 52 ("HPC") and high-pressure turbine 54 ("HPT"). A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 drive the respective low spool 30 and high spool 32 in response to the expansion.

In one example, the gas turbine engine 20 is a high-bypass geared architecture engine in which the bypass ratio is greater than about six (6:1). The geared architecture 48 can include an epicyclic gear system 58, such as a planetary gear system (FIG. 2), star gear system (FIG. 3) or other system. The example epicyclic gear train has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 4:
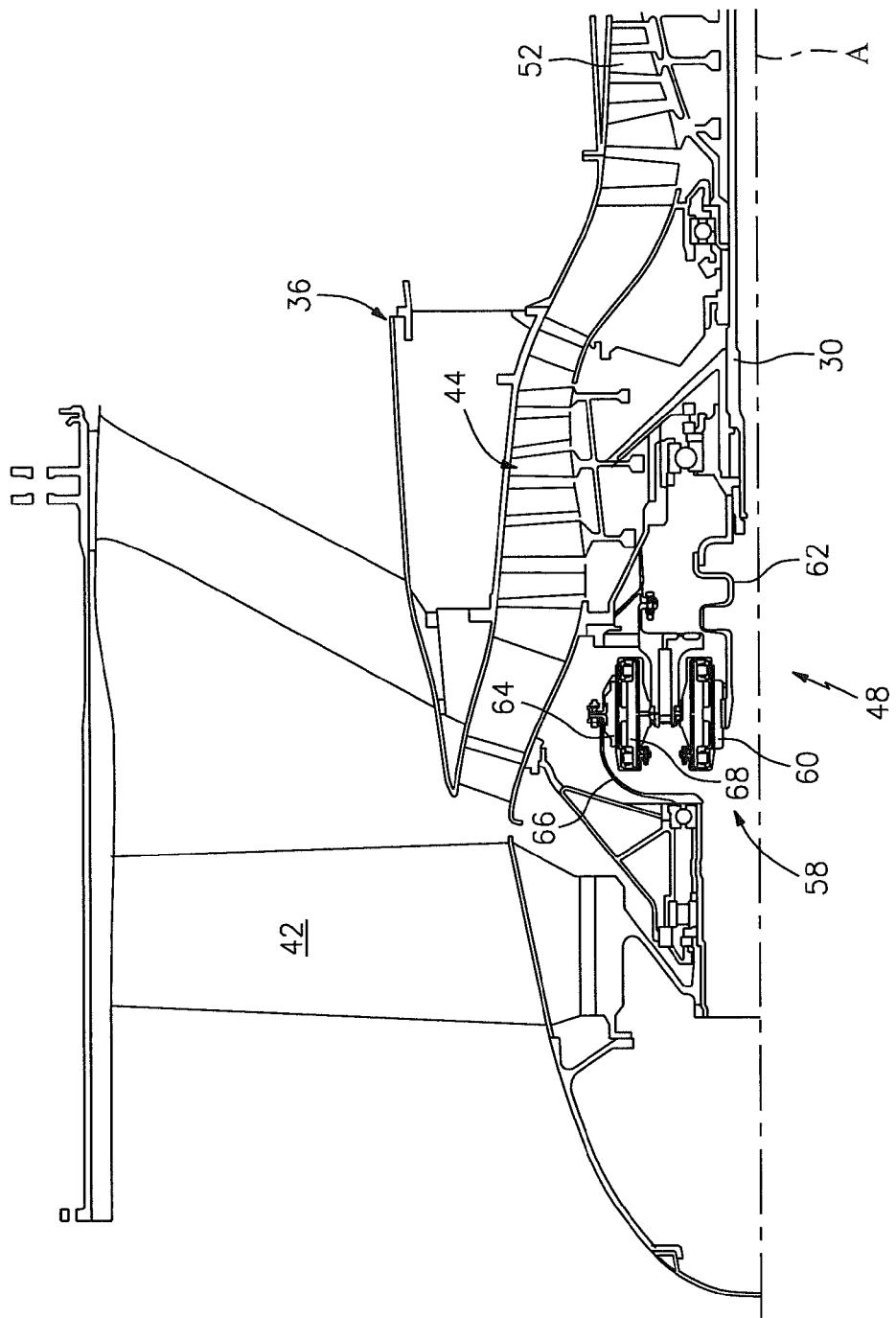
FIG. 4 is an schematic front view of a star gear type epicyclic gear system of the geared architecture according to another disclosed non-limiting embodiment.

With reference to FIG. 4, the epicyclic gear system 58 generally includes a sun gear 60 driven by a flexible input shaft 62 driven by the low spool 30, a ring gear 64 connected to a ring gear output shaft 66 which connects the geared architecture 48 with the fan 42, and a set of intermediate gears 68 in meshing engagement with the sun gear 60 and ring gear 64. The flexible input shaft 62 transfers torque as well as facilitates the segregation of vibrations and other transients.

Figure 2:
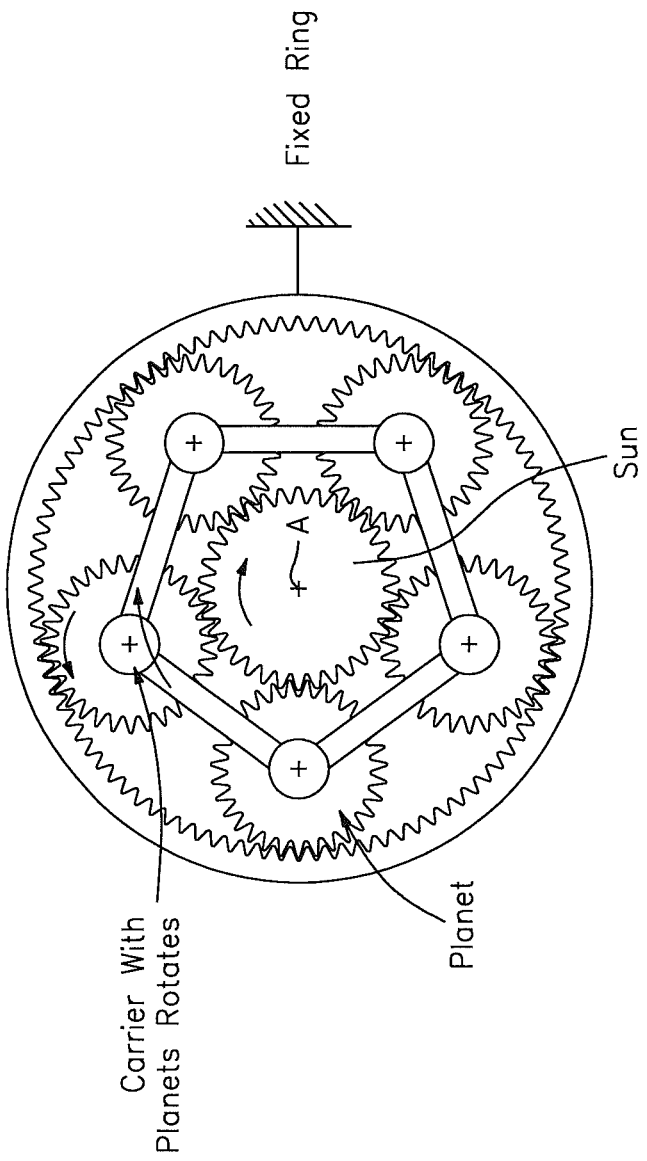
FIG. 2 is an expanded schematic view of the geared architecture.
Figure 3:
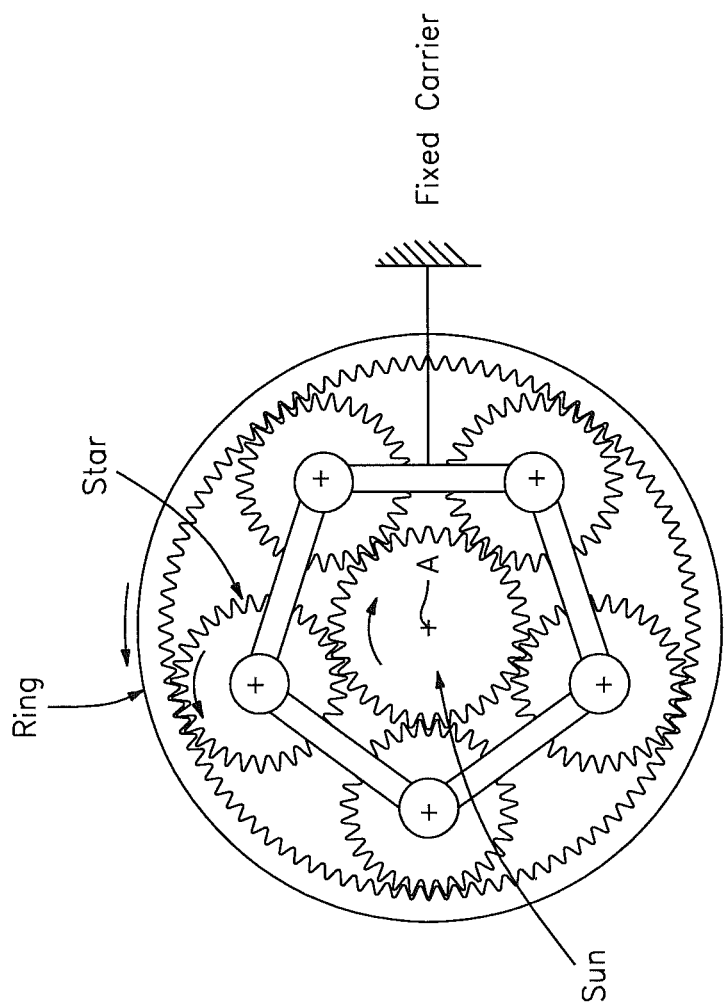
FIG. 3 is an schematic front view of a planetary gear system type epicyclic gear system of the geared architecture according to one disclosed non-limiting embodiment.
Figure 5:
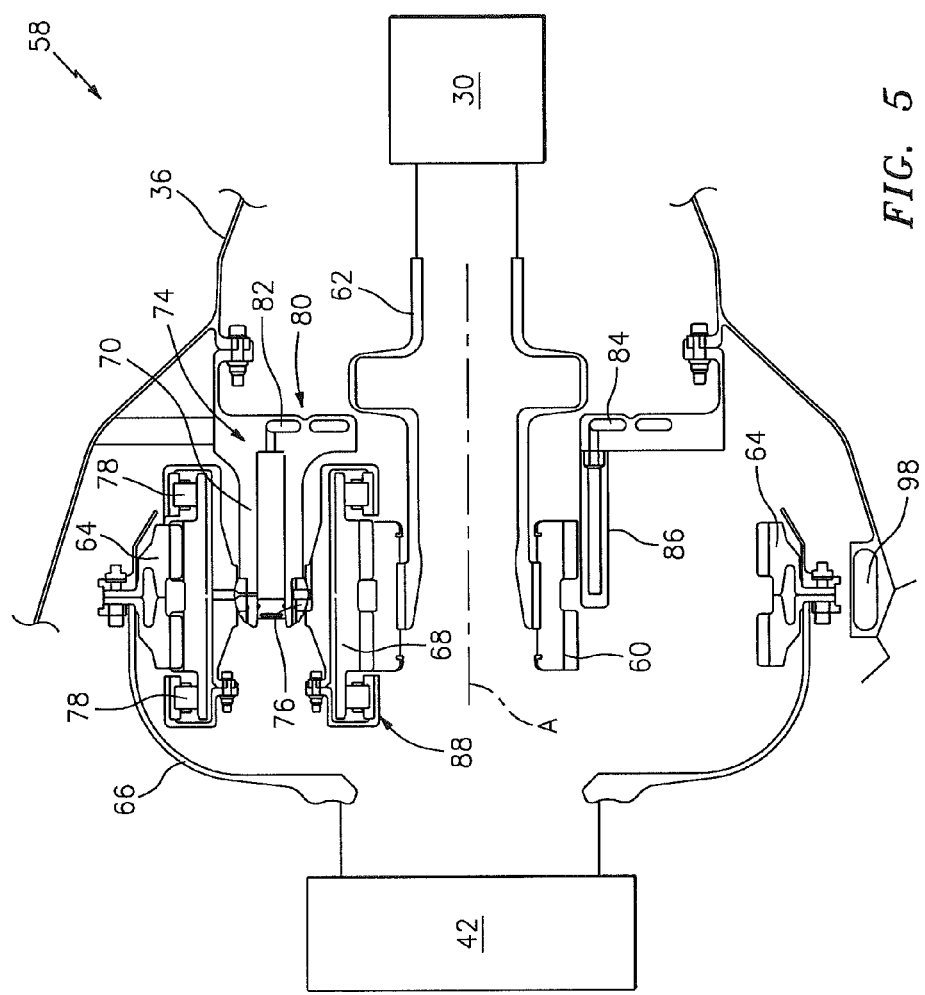
FIG. 5 is an sectional view of the epicyclic gear system along line 5-5 in FIG. 7.

With reference to FIG. 5, each intermediate gear 68 is rotationally mounted about a non-rotating flexible carrier post 70 that is respectively supported by a carrier 74 rotationally fixed to the engine case assembly 36. In another, disclosed, non-limiting embodiment, the carrier may rotate while the ring gear is fixed (FIG. 2). Each of the intermediate gears 68 is rotationally mounted on a respective spherical joint 76 mounted to each of the non-rotating flexible carrier posts 70. The spherical joint 76 and non-rotating flexible carrier posts 70 allow the system to flex or "squirm" to reduce misalignment and minimize loads upon the intermediate gears 68 as well as permit the use of relatively large rolling element bearings 78 such as cylindrical roller or ball bearings. That is, the spherical joints 76 permit angular movement of the non-rotating flexible carrier posts 70 with minimal, if any, effect upon the intermediate gears 68.

The carrier 74 includes an oil manifold 80 that communicates oil through a first oil circuit 82 into each flexible carrier post 70 and a second oil circuit 84 through a multiple of oil nozzles 86 mounted to the carrier 74. That is, the first oil circuit 82 communicates oil into each flexible carrier post 70 and thereby into the spherical joints 76, then a structural oil baffle housing 88 and onto the rolling element bearings 78. The second oil circuit 84 communicates oil as, for example, a spray directly onto the mesh between the sun gear 60 and the intermediate gears 68.

Figure 6:
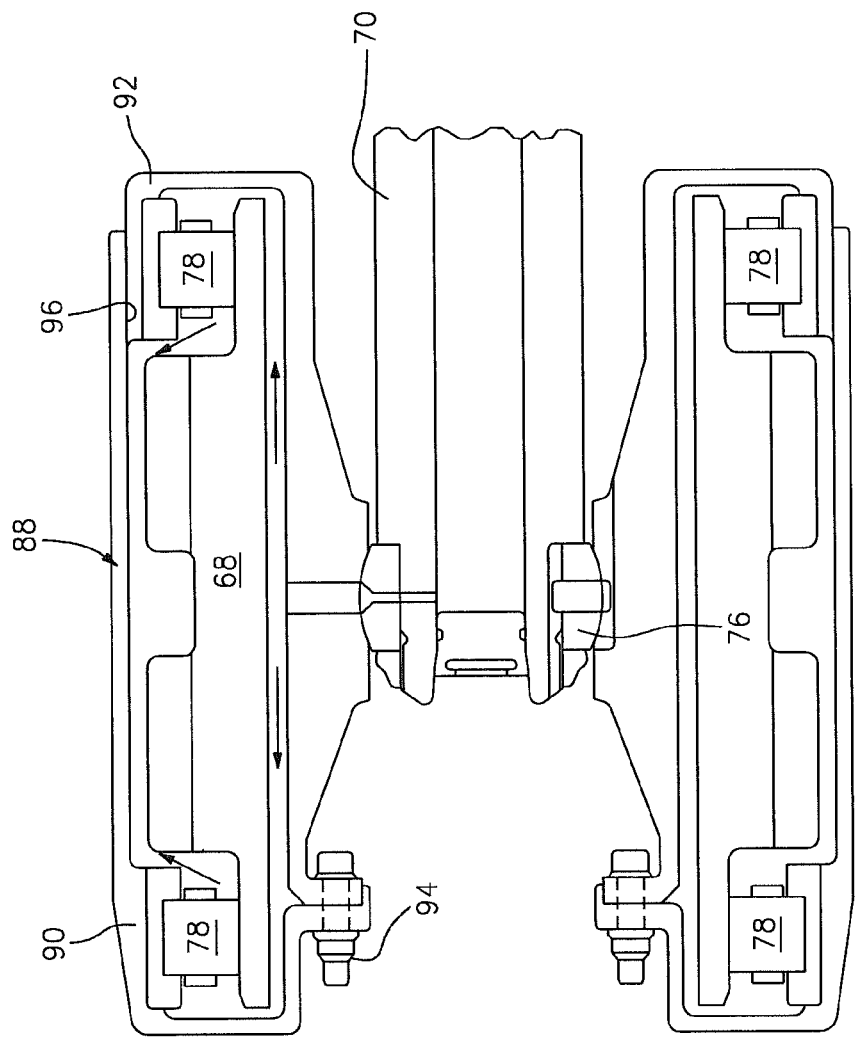
FIG. 6 is a sectional view of the epicyclic gear system along line 6-6 in FIG. 7.

With reference to FIG. 6, the rolling element bearings 78 are mounted within the structural oil baffle housing 88. The structural oil baffle housing 88 operates to support the intermediate gears 68 as well as an oil baffle to direct oil to the rolling element bearings 78. The structural oil baffle housing 88 may include a first baffle portion 90 and a second baffle portion 92 which may be attached together, for example, with fasteners 94 and a tight overlap interface 96. Various interfaces and baffle assembly methods may alternatively be provided.

Figure 7:
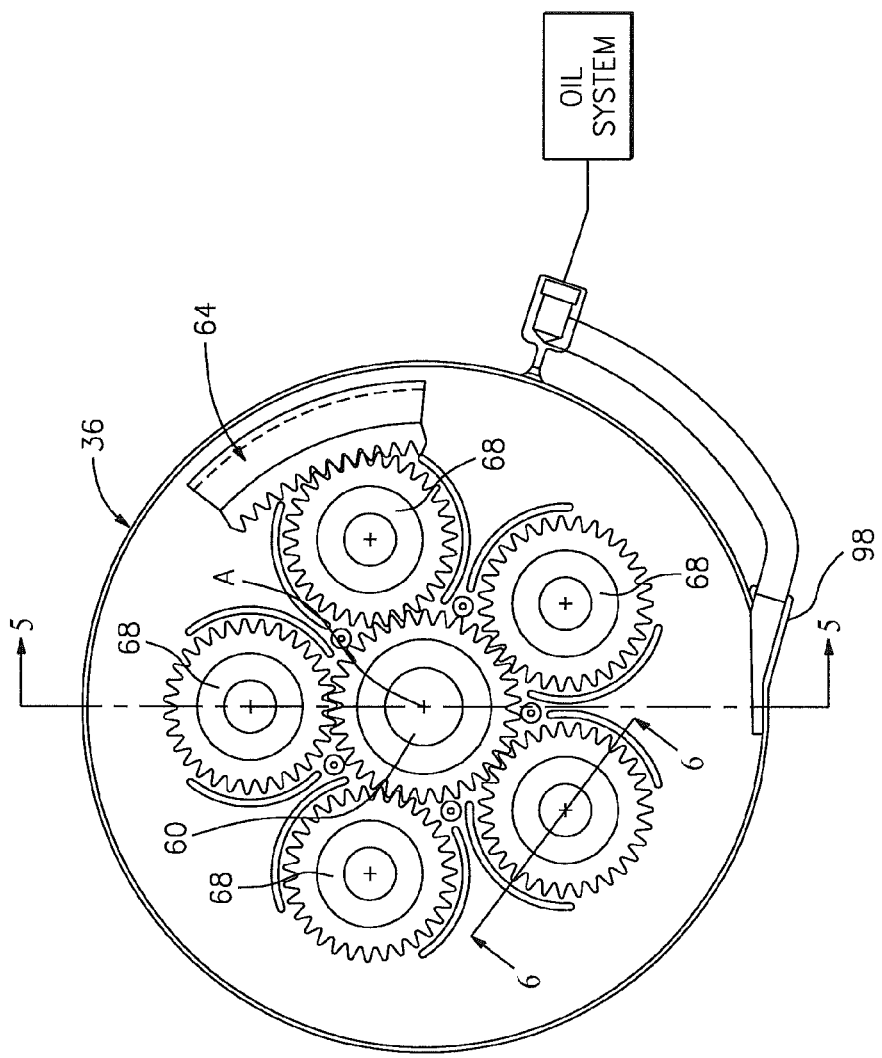
FIG. 7 is a schematic front view of an epicyclic gear system with a structural oil baffle housing according to one disclosed non-limiting embodiment.

The structural oil baffle housing 88 is circumferentially segmented arcuate shape (FIG. 7) about each intermediate gear 68 to permit gear mesh with the ring gear 64 and the sun gear 60 as well as entry and exit of oil. The structural oil baffle housing 88 is thereby shaped to direct oil without separate pressurization.

Once communicated through the epicyclic gear system 58 the oil is radially expelled into an engine case 36-1 often referred to as a front center body of the engine case assembly 36. To scavenge the oil rejected from the epicyclic gear system 58, the engine case 36-1 includes an oil scavenge scoop 98 to capture oil.

The structural oil baffle housing 88 reduces misalignment in the rolling element bearings 78, which facilities usage of relatively higher capacity rolling element bearings 78 as compared to other bearing types. The structural oil baffle housing 88 also facilities direction of scavenge oil out to the ring gear 64 which facilitates an increase in efficiency from 98% to 99.5% efficiency. The difference in heat loss of 0.5% versus 2.0% drives a large amount of weight out of the oil cooling system which facilitates a size reduction of air-oil and fuel-oil coolers for engine thermal management to thereby facilitate a reduction in cost, weight and complexity of the engine 20.

It should be understood that like reference numerals identify corresponding or similar elements throughout the several drawings. The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine, comprising:
   a geared architecture with a multiple of intermediate gears; and
   a structural oil baffle housing that at least partially supports said set of intermediate gears;
   wherein each of said multiple of intermediate gears is mounted to a respective flexible carrier post; and
   wherein said structural oil baffle housing is mounted to a spherical joint mounted to each flexible carrier post.

2. The gas turbine engine as recited in claim 1, further comprising a rotationally fixed carrier, each of said multiple of intermediate gears mounted wherein the respective flexible carrier posts extend from said carrier.

3. The gas turbine engine as recited in claim 2, further comprising an oil manifold defined by said carrier.

4. A gas turbine engine, comprising:
   a geared architecture with a multiple of intermediate gears;
   a structural oil baffle housing that at least partially supports said set of intermediate gears;
   a rotationally fixed carrier, each of said multiple of intermediate gears mounted to a respective flexible carrier post which extends from said carrier; and
   an oil manifold defined by said carrier;
   wherein said oil manifold includes a first oil circuit and a second oil circuit; and
   wherein said first oil circuit communicates with each respective flexible carrier post.

5. The gas turbine engine as recited in claim 4, wherein said second oil circuit communicates with a multiple of oil nozzles.

6. The gas turbine engine as recited in claim 4, further comprising a rolling element bearing mounted between said structural oil baffle housing and each of said multiple of intermediate gears.

7. The gas turbine engine as recited in claim 6, wherein said structural oil baffle housing directs oil to said multiple of intermediate gears.

8. The gas turbine engine as recited in claim 4, wherein said geared architecture includes a planetary gear system.

9. The gas turbine engine as recited in claim 4, wherein said geared architecture includes a star gear system.

10. A gas turbine engine, comprising:
    a carrier which defines an oil manifold with a first oil circuit and a second oil circuit;
    a multiple of flexible carrier post which extends from said carrier to support a respective intermediate gear, said first oil circuit communicates with each respective flexible carrier post;
    a structural oil baffle housing which at least partially supports said set of intermediate gears; and
    a multiple of oil nozzles in communication with said second oil circuit.

11. The gas turbine engine as recited in claim 6, wherein said multiple of oil nozzles are external to said structural oil baffle housing.

12. The gas turbine engine as recited in claim 11, wherein said multiple of oil nozzles are each adjacent to a sun gear and one of said multiple of intermediate gears.

13. The gas turbine engine as recited in claim 10, further comprising a rolling element bearing mounted between said structural oil baffle housing and each of said multiple of intermediate gears.

14. The gas turbine engine as recited in claim 13, wherein said rolling element bearing is a ball bearing.

15. The gas turbine engine as recited in claim 13, wherein said rolling element bearing is a roller bearing.

16. The gas turbine engine as recited in claim 1, wherein said geared architecture includes a planetary gear system.

17. The gas turbine engine as recited in claim 1, wherein said geared architecture includes a star gear system.

* * * * *